(12) United States Patent
Watanabe

(10) Patent No.: US 11,917,308 B2
(45) Date of Patent: Feb. 27, 2024

(54) IMAGING DEVICE, IMAGE RECORDING DEVICE, AND IMAGING METHOD FOR CAPTURING A PREDETERMINED EVENT

(71) Applicant: SONY SEMICONDUCTOR SOLUTIONS CORPORATION, Kanagawa (JP)

(72) Inventor: Goshi Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/429,719

(22) PCT Filed: Feb. 10, 2020

(86) PCT No.: PCT/JP2020/005203
§ 371 (c)(1),
(2) Date: Aug. 10, 2021

(87) PCT Pub. No.: WO2020/170889
PCT Pub. Date: Aug. 27, 2020

(65) Prior Publication Data
US 2022/0132029 A1   Apr. 28, 2022

(30) Foreign Application Priority Data
Feb. 19, 2019   (JP) .................. 2019-027848

(51) Int. Cl.
*H04N 23/951*   (2023.01)
*B60R 1/22*   (2022.01)
(Continued)

(52) U.S. Cl.
CPC .......... *H04N 23/951* (2023.01); *H04N 23/61* (2023.01); *H04N 23/76* (2023.01); *B60R 1/22* (2022.01)

(58) Field of Classification Search
CPC .......... H04N 5/23232; H04N 5/23218; H04N 5/243; B60R 1/22
(Continued)

(56) References Cited

U.S. PATENT DOCUMENTS 8,587,658 B2 * 11/2013 Nitta .................. H04N 1/00458
348/169
8,754,977 B2 * 6/2014 Voss ..................... H04N 5/2355
348/230.1
(Continued)

FOREIGN PATENT DOCUMENTS

CN   104967803 A   10/2015
JP   2007-214769 A   8/2007
(Continued)

OTHER PUBLICATIONS

International Search Report and Written Opinion of PCT Application No. PCT/JP2020/005203, dated May 12, 2020, 09 pages of ISRWO.

*Primary Examiner* — Usman A Khan
(74) *Attorney, Agent, or Firm* — CHIP LAW GROUP

(57) ABSTRACT

Provided are an imaging device, an image recording device, and an imaging method capable of recording an important moment. An imaging device includes an imaging unit and a changing unit. The imaging unit captures an image of the surroundings, and generates image data. The changing unit changes the frame rate of an image captured by the imaging unit in accordance with the degree of possibility that a predetermined event occurs, which is predicted based on the image data.

9 Claims, 5 Drawing Sheets

(51) Int. Cl.
*H04N 23/61* (2023.01)
*H04N 23/76* (2023.01)

(58) Field of Classification Search
USPC .................................................. 348/207.99
See application file for complete search history.

(56) References Cited

U.S. PATENT DOCUMENTS

| | | | | |
|---|---|---|---|---|
| 2003/0197790 A1* | 10/2003 | Bae | ................... | H04N 1/00307 |
| | | | | 348/E5.037 |
| 2006/0007314 A1* | 1/2006 | Fong | ...................... | H04N 5/232 |
| | | | | 348/207.99 |
| 2006/0256207 A1* | 11/2006 | Kokubo | ............... | H04N 25/533 |
| | | | | 348/E3.019 |
| 2007/0217765 A1* | 9/2007 | Itoh | ......................... | H04N 5/76 |
| | | | | 386/233 |
| 2009/0073285 A1* | 3/2009 | Terashima | ....... | H04N 5/232939 |
| | | | | 348/222.1 |
| 2009/0160976 A1* | 6/2009 | Chen | .................... | H04N 5/2354 |
| | | | | 348/E9.053 |
| 2009/0244318 A1* | 10/2009 | Makii | ................ | H04N 5/23245 |
| | | | | 348/229.1 |
| 2010/0002080 A1* | 1/2010 | Maki | .................... | H04N 19/124 |
| | | | | 348/148 |
| 2010/0157136 A1* | 6/2010 | Li | .................... | H04N 5/232123 |
| | | | | 348/349 |
| 2011/0057783 A1* | 3/2011 | Yagi | .................. | H04N 5/23293 |
| | | | | 348/148 |
| 2012/0033042 A1* | 2/2012 | Mori | .................... | H04N 7/0132 |
| | | | | 348/E7.003 |
| 2016/0080652 A1* | 3/2016 | Shirota | ............ | H04N 5/232411 |
| | | | | 348/222.1 |
| 2017/0150222 A1* | 5/2017 | Kim | ................... | H04N 21/4312 |
| 2017/0310901 A1* | 10/2017 | Sheikh | ...................... | G01S 3/00 |
| 2018/0307912 A1* | 10/2018 | Selinger | ................ | G06K 9/6256 |
| 2019/0340496 A1 | 11/2019 | Kim et al. | | |

FOREIGN PATENT DOCUMENTS

| | | | |
|---|---|---|---|
| JP | 2009049946 A | * | 3/2009 |
| JP | 2010-134745 A | | 6/2010 |
| JP | 2014-078071 A | | 5/2014 |
| JP | 2018-173944 A | | 11/2018 |
| WO | 2018/180750 A1 | | 10/2018 |

\* cited by examiner

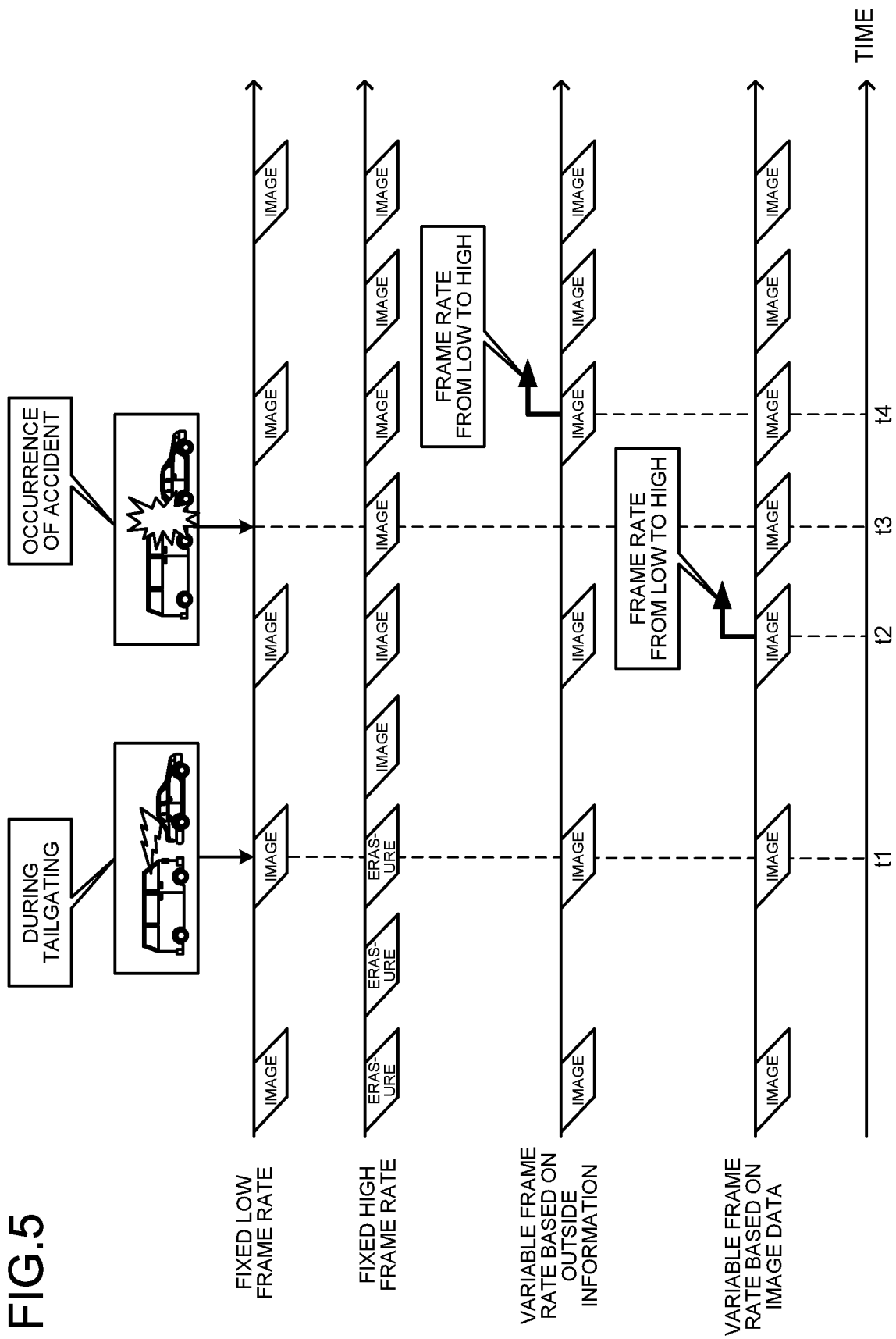

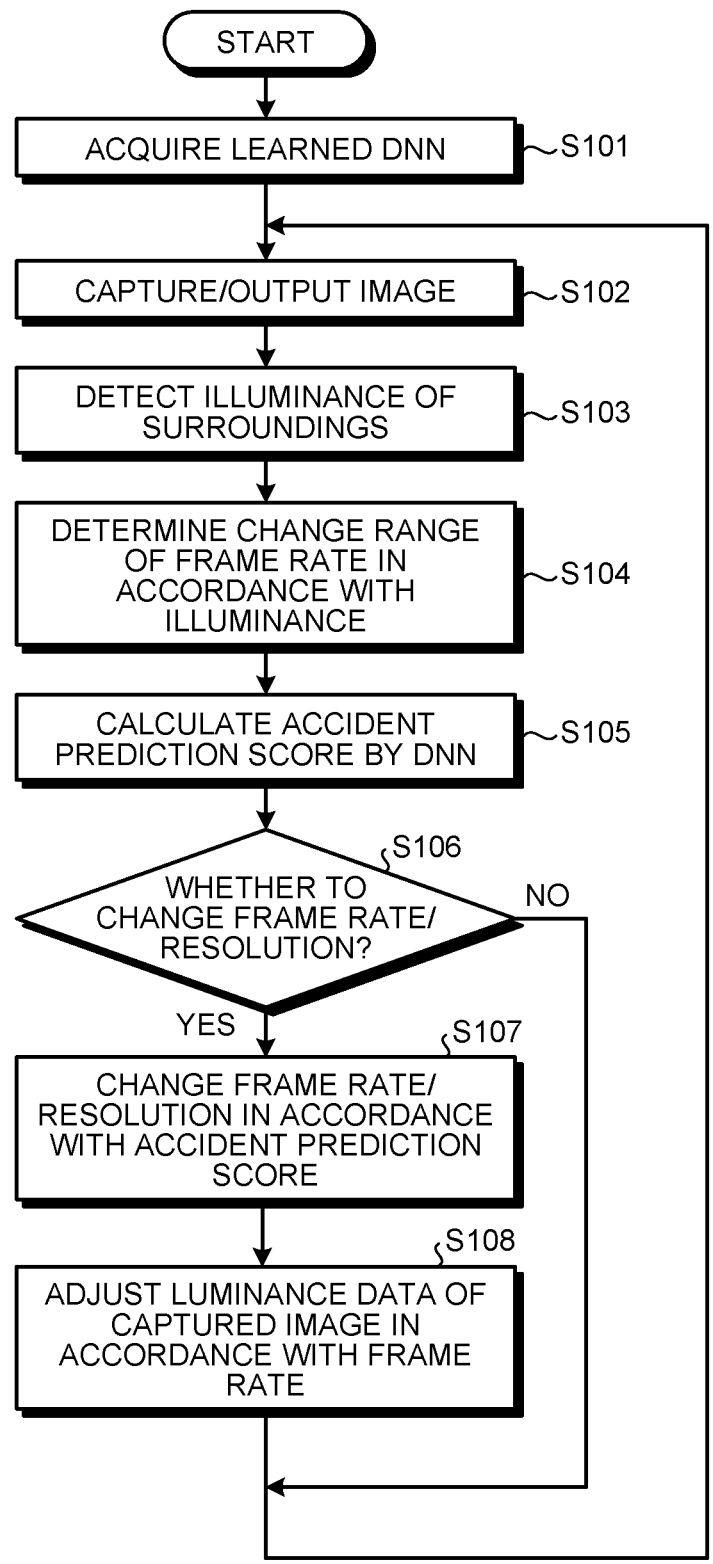

IMAGING DEVICE, IMAGE RECORDING DEVICE, AND IMAGING METHOD FOR CAPTURING A PREDETERMINED EVENT

FIELD

Cross Reference to Related Applications

This application is a U.S. National Phase of International Patent Application No. PCT/JP2020/005203 filed on Feb. 10, 2020, which claims priority benefit of Japanese Patent Application No. JP 2019-027848 filed in the Japan Patent Office on Feb. 19, 2019. Each of the above-referenced applications is hereby incorporated herein by reference in its entirety.

The present disclosure relates to an imaging device, an image recording device, and an imaging method.

BACKGROUND

For example, there is provided a drive recorder that can record a situation at the time of occurrence of a car accident by being mounted in a vehicle, capturing an image of the surroundings of the vehicle, and storing image data of the captured image in a memory. The drive recorder can record a long-time image by setting a relatively low frame rate for capturing an image, but may fail to record an important moment at the time of the occurrence of the accident.

In contrast, if a relatively high frame rate is set, the drive recorder can record an important moment at the time of the occurrence of an accident without missing the moment. Since there is an upper limit to the capacity of a memory for storing image data, however, images before and after the occurrence of the accident may be erased and fail to be recorded.

For example, there is provided a vehicle video processing device that determines the driving state of a vehicle based on various pieces of information input from the outside and changes the frame rate in accordance with the determination result (e.g., Patent Literature 1).

CITATION LIST

Patent Literature

Patent Literature 1: JP 2007-214769 A

SUMMARY

Technical Problem

Unfortunately, the above-described conventional technology may fail to record an important moment. In the present disclosure, proposed are an imaging device, an image recording device, and an imaging method capable of recording an important moment.

Solution to Problem

An imaging device according to the present disclosure includes an imaging unit and a changing unit. The imaging unit captures an image of the surroundings, and generates image data. The changing unit changes the frame rate of an image captured by the imaging unit in accordance with the degree of possibility that a predetermined event occurs, which is predicted based on the image data.

BRIEF DESCRIPTION OF DRAWINGS

FIG. 5 is an explanatory diagram of the operation of a CIS according to the present disclosure.

FIG. 6 is a flowchart illustrating one example of processing executed by the CIS according to the present disclosure.

DESCRIPTION OF EMBODIMENTS

Embodiments of the present disclosure will be described in detail below with reference to the drawings. Note that, in the following embodiments, the same signs are attached to the same parts, so that duplicate description will be omitted. Although a case where an image recording device according to the present disclosure is a drive recorder mounted in a vehicle will be described below, the image recording device is not limited to the drive recorder.

The image recording device according to the present disclosure can also be mounted on any moving object such as a motorcycle, a bicycle, an electric wheelchair, and a drone to capture and record an image of the surroundings. Furthermore, the image recording device according to the present disclosure can also be used as, for example, a camera for observing wild birds and wild animals and a surveillance camera installed on a street, a building, a facility, or the like.

1. Configuration of Image Recording Device

Figure 1:
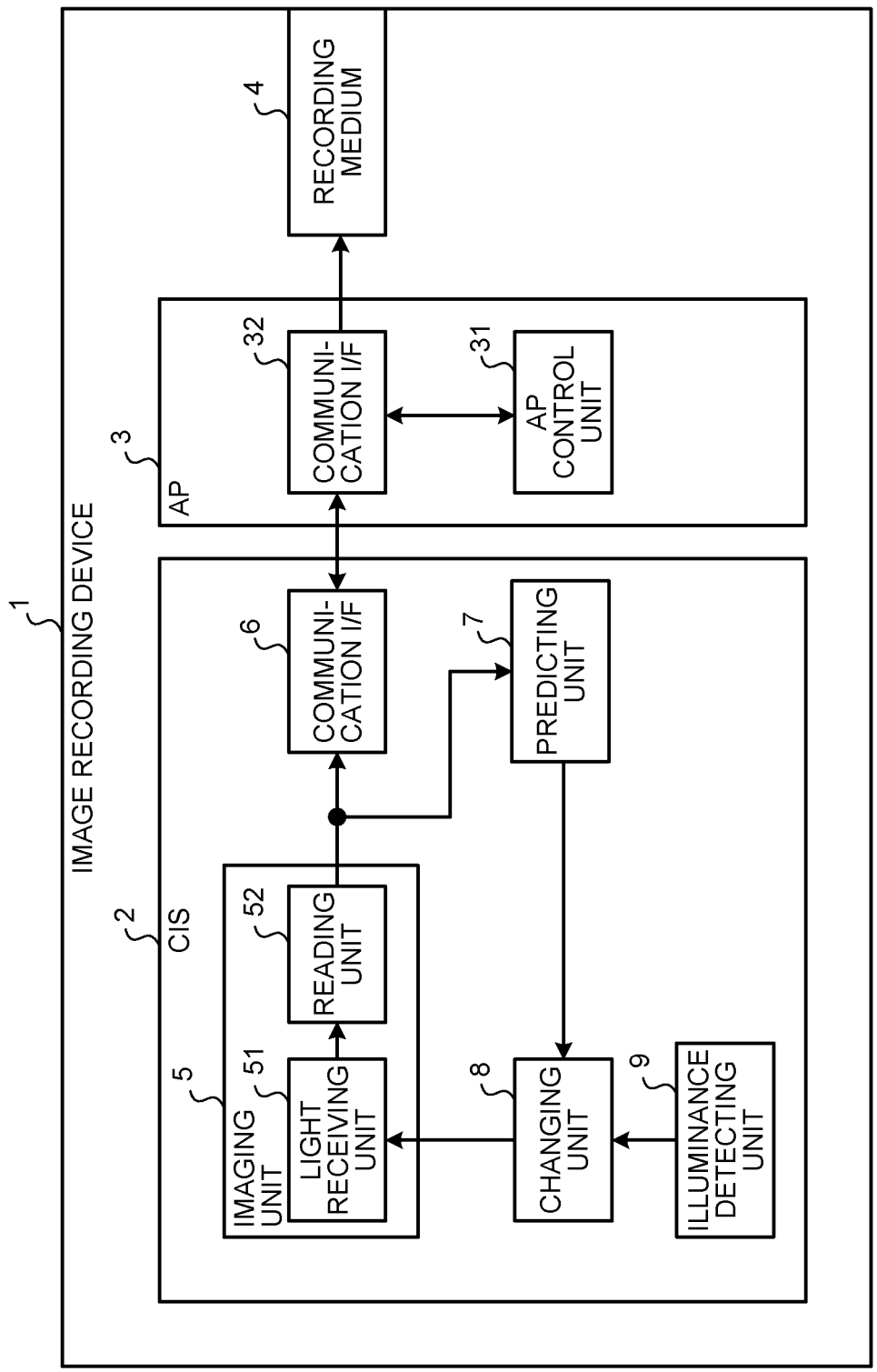
FIG. 1 is a block diagram illustrating a schematic configuration example of an image recording device according to the present disclosure.

FIG. 1 is a block diagram illustrating a schematic configuration of an image recording device according to the present disclosure. As illustrated in FIG. 1, An image recording device 1 includes a complementary metal oxide semiconductor (CMOS) image sensor (hereinafter referred to as a CIS 2), an application processor (hereinafter referred to as an AP 3), and a recording medium 4.

The CIS 2 is one example of an imaging device that includes one chip and images the surroundings such as the front, side, and rear of a vehicle. The CIS 2 outputs image data of a captured image to the AP 3. Note that the imaging device according to the present disclosure is not limited to the CIS 2. The imaging device may be another image sensor such as a charge coupled device (CCD) image sensor.

The AP 3 includes an AP control unit 31 and a communication interface (I/F) 32. The AP control unit 31 is one example of a processor such as a central processing unit (CPU) that executes various application programs suitable for use in the image recording device 1. The communication I/F 32 communicates information with the CIS 2.

For example, the AP control unit 31 performs correction processing and treatment processing of image data input from the CIS 2 via the communication I/F 32. In addition, the AP control unit 31, for example, writes and erases image data to/in the recording medium 4 via the communication I/F 32. The AP control unit 31 writes the latest image data to the recording medium 4. When the upper limit of the recording capacity is reached, the AP control unit 31 overwrites image data in chronological order from the oldest image data with the latest image data.

The recording medium 4 is one example of a recording unit that stores an image captured by the CIS 2, and is, for example, a removable recording device such as an SD memory card. The recording medium 4 records image data of a captured image captured in the most recent predetermined time (e.g., one hour). Time of a video that can be recorded by the recording medium 4 varies depending on a frame rate at which the image is captured and the resolution of the image.

Although, when a captured image has a relatively low frame rate and resolution, the recording medium 4 can extend the time of a recordable video, the recording medium 4 may fail to record an important moment at the time of the occurrence of an accident. For example, when an accident occurs between frames of a captured image, the recording medium 4 cannot record an image at the moment of the occurrence of the accident.

Furthermore, although, when a captured image has a relatively high frame rate and resolution, the recording medium 4 can record the moment of the occurrence of the accident, the recording medium 4 may fail to record the moment since the time of an imageable video is shortened and thus images before and after the occurrence of the accident are erased.

For example, when an accident occurs due to tailgating that has continued for one hour or more, the recording medium 4 can record an image of the moment of the occurrence of the accident, but cannot record images of the tailgating that causes the accident since the images has been erased.

For this reason, for example, the frame rate and resolution are changed in accordance with a vehicle driving state determined based on various pieces of information collected from an external device such as a car navigation device and an obstacle detection device. Nevertheless, an important moment may fail to be recorded.

For example, when it takes time from the start of information collection from the outside to the change of the frame rate, and the change for increasing the frame rate is not in time before an accident occurs, the recording medium 4 may fail to record an image of the moment of the occurrence of the accident.

The CIS 2 according to the present disclosure has a configuration that enables recording of an important moment. Specifically, the CIS 2 includes an imaging unit 5, a communication interface (I/F) 6, a predicting unit 7, a changing unit 8, and an illuminance detecting unit 9.

The imaging unit 5 includes a light receiving unit 51 and a reading unit 52. The light receiving unit 51 includes, for example, an optical system and a pixel array unit. The optical system includes a zoom lens, a focus lens, and a diaphragm. In the pixel array unit, unit pixels including a light receiving element such as a photodiode are arranged in a two-dimensional matrix.

The light receiving unit 51 forms an image of light incident from the outside on a light receiving surface of the pixel array unit by using the optical system. Each unit pixel of the pixel array unit readably accumulates a charge in accordance with an amount of incident light by photoelectrically converting light incident on the light receiving element.

The reading unit 52 includes a reading circuit and an analog to digital converter (ADC). The reading circuit reads a charge accumulated in each unit pixel as a pixel signal. The ADC generates digital image data by converting the analog pixel signal read by the reading circuit into a digital value. The reading unit 52 outputs the generated image data to the communication I/F 6 and the predicting unit 7.

The communication I/F 6 outputs image data input from the imaging unit 5 to the AP 3. Furthermore, the communication I/F 6 acquires the later-described deep neural network (DNN) from the AP 3, and outputs the DNN to the predicting unit 7.

The predicting unit 7 includes, for example, a microcomputer and various circuits. The microcomputer includes a central processing unit (CPU), a read only memory (ROM), and a random access memory (RAM).

The CPU executes a program stored in the ROM by using the RAM as a work area. Thereby, the predicting unit 7 predicts the degree of possibility that a predetermined event occurs based on image data input from the imaging unit 5. For example, the predicting unit 7 predicts the degree of possibility that a vehicle mounted with the image recording device 1 has a vehicle accident (accident occurs).

Note that a part or all of the predicting unit 7 may be composed of hardware such as an application specific integrated circuit (ASIC) and a field programmable gate array (FPGA).

For example, the predicting unit 7 calculates an accident prediction score indicating the degree of possibility that an accident occurs by DNN processing using the DNN. The DNN is preliminarily generated by machine learning using, as teacher data, image data of a large number of images captured before an actual accident occurs and image data of a large number of images in the case where no accident has occurred after the capturing.

The predicting unit 7 calculates an accident prediction score by using a DNN acquired from the AP 3 via the communication I/F 6 and performing DNN processing on image data input from the imaging unit 5, and outputs the accident prediction score to the changing unit 8. A higher value of the accident prediction score indicates the higher possibility that an accident occurs. Note that the predicting unit 7 may preliminarily store the DNN.

For example, when a person is around a vehicle, a vehicle approaches an intersection, and the distance between a preceding vehicle and a following vehicle is shortened, the predicting unit 7 predicts that an accident is highly likely to occur. In the case, the predicting unit 7 calculates a higher accident prediction score as the distance to the person around the vehicle, the distance to the intersection, and the distance to another vehicle are shortened.

Note that the predicting unit 7 can calculate the accident prediction score by using not only the DNN but various neural networks such as a recurrent neural network (RNN) and a convolutional neural network (CNN). Furthermore, the predicting unit 7 may be configured to calculate the accident prediction score by using a learning model learned by various other pieces of machine learning such as a decision tree and a support vector machine.

The changing unit 8 determines the frame rate and resolution of an image to be captured by the imaging unit 5 in accordance with the accident prediction score input from the predicting unit 7. The changing unit 8 changes the frame rate and resolution by outputting information for setting the determined frame rate and resolution to the imaging unit 5.

Figure 2:
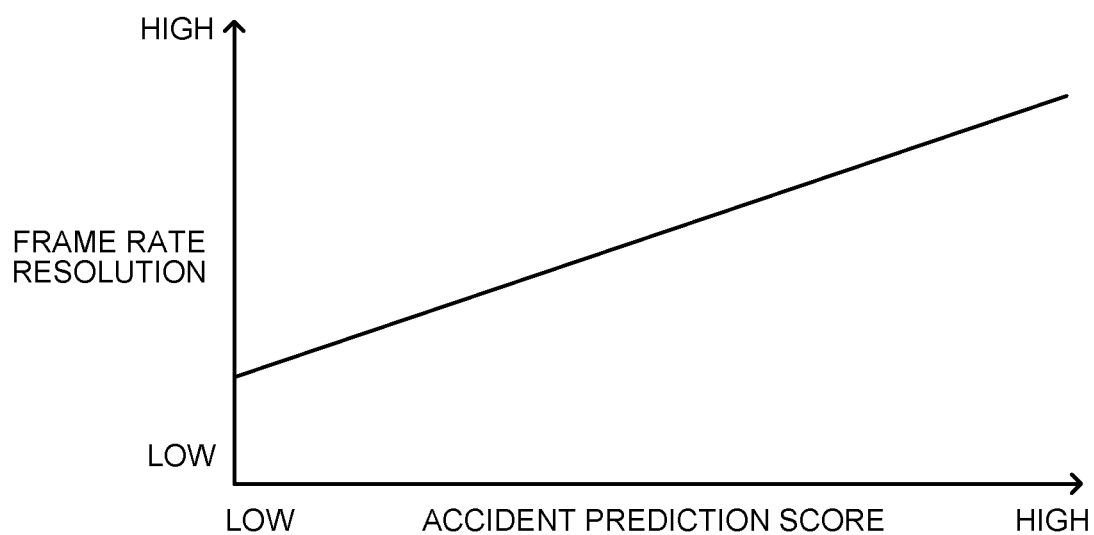
FIG. 2 is an explanatory diagram illustrating the relation between an accident prediction score and a frame rate and resolution according to the present disclosure.

FIG. 2 is an explanatory diagram illustrating the relation between the accident prediction score and the frame rate and resolution according to the present disclosure. As illustrated in FIG. 2, the changing unit 8 makes a change so that, as the accident prediction score is increased, the frame rate and resolution are increased.

Note that, when the value of the accident prediction score input from the predicting unit 7 decreases after increasing the frame rate and resolution, the changing unit 8 makes a change to decrease the frame rate and resolution.

Note that, although the changing unit 8 changes the frame rate and resolution in accordance with the accident prediction score here, the changing unit 8 can change at least one of the frame rate and resolution in accordance with the accident prediction score.

As a result, the imaging unit 5 shortens the time interval for capturing an image as the possibility that an accident occurs is increased. This allows the imaging unit 5 to capture an image of a moment having an important meaning at the time of occurrence of the accident, such as a moment of the occurrence of the accident. Furthermore, the imaging unit 5 increases the resolution of a captured image as the possibility that an accident occurs is increased. This allows the imaging unit 5 to capture a high-definition image of a moment at the time of occurrence of the accident. The moment has an important meaning at the time of occurrence of the accident.

Here, for example, if the changing unit 8 excessively increases the frame rate in the case where the accident prediction score is increased due to a dark surrounding environment at night, exposure time is reduced, which causes negative effects such as a so-called black defect. The black defect is a phenomenon in which the entire captured image is darkened.

The illuminance detecting unit 9 detects the illuminance of the surroundings of a vehicle, and outputs information indicating the detected illuminance to the changing unit 8. The changing unit 8 determines the change range of the frame rate in accordance with the illuminance of the surroundings based on the information indicating the illuminance input from the illuminance detecting unit 9.

Figure 3:
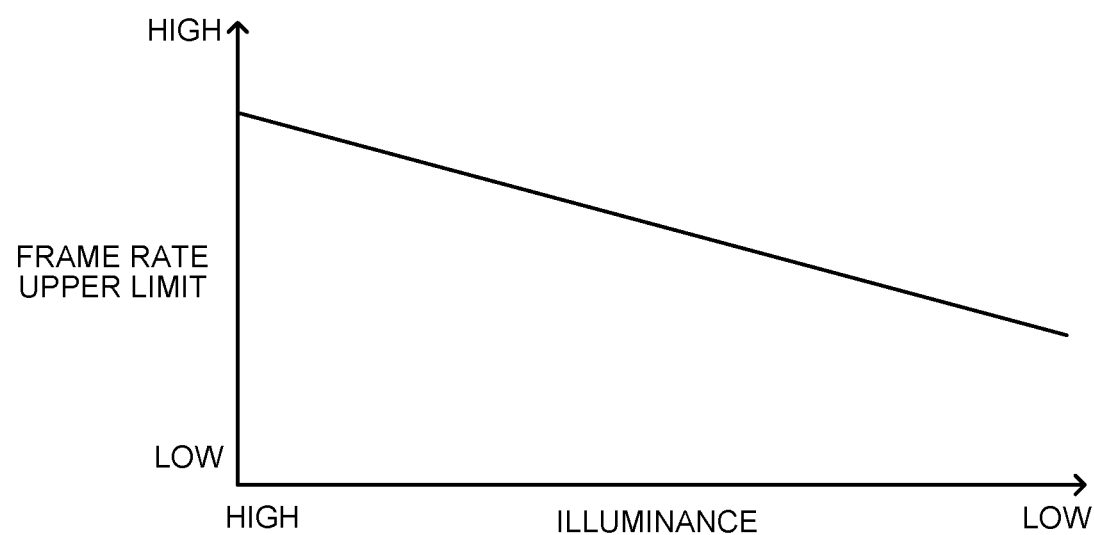
FIG. 3 is an explanatory diagram illustrating the relation between illuminance and the upper limit of the frame rate according to the present disclosure.

FIG. 3 is an explanatory diagram illustrating the relation between the illuminance and the upper limit of the frame rate according to the present disclosure. As illustrated in FIG. 3, the changing unit 8 determines that the upper limit of the frame rate to be changed is decreased as the illuminance of the surroundings of a vehicle is decreased. As a result, the changing unit 8 can prevent the occurrence of a black defect in a captured image at night.

Furthermore, the reading unit 52 of the imaging unit 5 adjusts luminance data of the captured image in accordance with the frame rate changed by the changing unit 8. The changing unit 8 adjusts the luminance of the captured image by changing the gain of an amplifier that amplifies the luminance data of the captured image.

Figure 4:
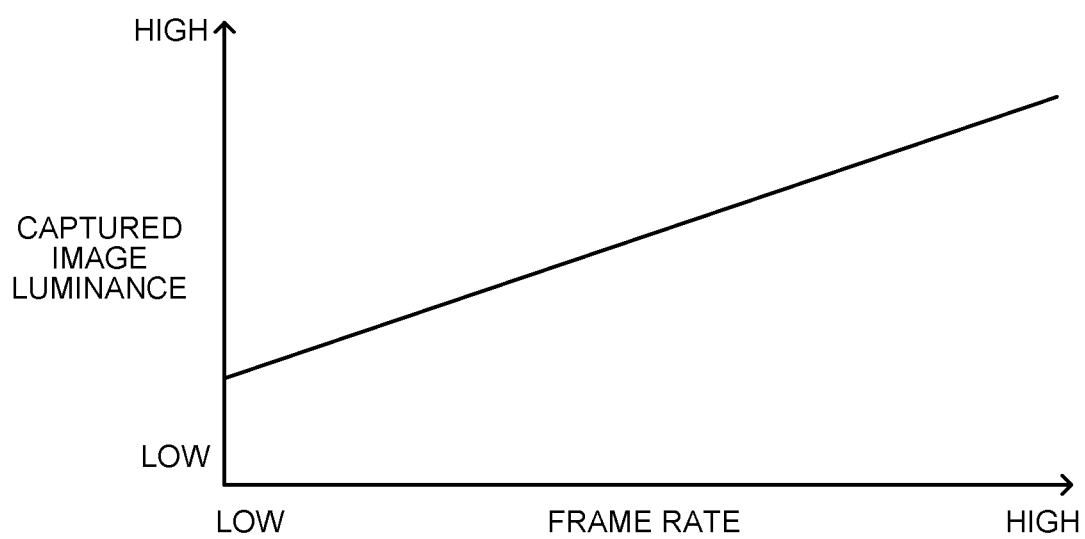
FIG. 4 is an explanatory diagram illustrating the relation between the frame rate and the luminance of a captured image according to the present disclosure.

FIG. 4 is an explanatory diagram illustrating the relation between the frame rate and the luminance of a captured image according to the present disclosure. As illustrated in FIG. 4, the reading unit 52 makes an adjustment such that the luminance of the captured image is increased as the frame rate is increased. This can prevent the occurrence of a black defect on the captured image due to an increased frame rate.

Note that, although a case where the changing unit 8 changes the upper limit of the frame rate and the reading unit 52 adjusts the luminance of the captured image has been described here, at least one of the change of the upper limit of the frame rate and the adjustment of the luminance of the captured image may be performed.

In this way, in the image recording device 1, the predicting unit 7 in the CIS 2 predicts the degree of possibility that an accident occurs based on the data of an image captured by the imaging unit 5, and the changing unit 8 changes the frame rate and resolution of the captured image in accordance with the degree of possibility that a predicted accident occurs. The image recording device 1 as described above does not need time for collecting information from the outside in order to predict the occurrence of an accident.

This allows the image recording device 1 to change the frame rate without delay as compared with, for example, a device that predicts the occurrence of an accident and changes a frame based on various pieces of information collected from the outside. Therefore, for example, the image recording device 1 can record an image of an important moment of the occurrence of an accident at the time of the occurrence of the accident.

2. Operation Example of CIS

An example of the operation of the CIS 2 will now be described with reference to FIG. 5. Here, in order to clarify the effects of the operation of the CIS 2, the operation of the CIS 2 will be described after describing three contrast examples. FIG. 5 is an explanatory diagram of the operation of the CIS according to the present disclosure.

FIG. 5 illustrates, as the three contrast examples, imaging operations in a case of fixed low frame rate, a case of fixed high frame rate, and a case of variable frame rate based on outside information. FIG. 5 illustrates an imaging operation in a case of variable frame rate based on image data as an operation example of the CIS 2.

Furthermore, here, a case where a preceding vehicle suffers from tailgating of a following vehicle from time t1 and then a collision accident occurs at time t3 will be described in an example. As illustrated in FIG. 5, in the case of a fixed low frame rate, time interval for capturing an image is long, and the number of captured images is small. A data amount of image data is decreased, and, as a result, imaginable time is increased.

In the case of the fixed low frame rate, however, even if an image of a continuously performed event such as tailgating can be captured at the time t1, a moment of an event may fail to be captured when an accident occurs at the time t3.

In contrast, in the case of a fixed high frame rate, the time interval for capturing an image is short, so that an image of a moment of the occurrence of the accident can be captured at the time t3. In the case of the fixed high frame rate, however, the time required for the number of captured images to reach the upper limit of the recording capacity is shorter than that in the case of the fixed low frame rate, so that an image of tailgating that causes the accident captured at the time t1 may be erased, for example.

Furthermore, in the case of a variable frame rate based on outside information, for example, when the occurrence of an accident is predicted based on the outside information collected from the outside, change from the low frame rate to the high frame rate can be made.

In the case of the variable frame rate based on outside information, however, communication with an external device is necessary, and prediction of an accident based on a plurality of pieces of outside information is also necessary. Such communication and prediction take time.

Thus, in the case of the variable frame rate based on outside information, the change from the low frame rate to the high frame rate cannot be made by the time t3 at which an accident occurs. In such a case, for example, imaging at a high frame rate may be started at time t4 after the occurrence of an accident, and an image of a moment of the occurrence of the accident may fail to be captured at the time t3.

In contrast, the CIS 2 captures an image at a variable frame rate based on data of a captured image. Thus, the CIS 2 does not need to collect information from an external device. When the occurrence of an accident is predicted from the image data, the CIS 2 can make a change from the low frame rate to the high frame rate within a time shorter than that in the case of the variable frame rate based on the outside information.

Thus, for example, the CIS 2 captures an image at a low frame rate at a normal period to extend a recording time of image data. When predicting the occurrence of an accident from an image of tailgating at the time t1, the CIS 2 can make a change to the high frame rate at the time t2 before the occurrence of the accident.

The CIS 2 captures both of an image of tailgating that causes an accident and an image of a moment of the occurrence of the accident, and outputs the images to the AP 3. The CIS 2 can thus cause the recording medium 4 to record the images.

3. Processing Executed by CIS

Processing executed by the CIS 2 will now be described with reference to FIG. 6. FIG. 6 is a flowchart illustrating one example of the processing executed by the CIS according to the present disclosure. The CIS 2 executes the processing in FIG. 6 when a power source of a vehicle is turned on.

Specifically, as illustrated in FIG. 6, the CIS 2 first acquires a learned DNN from the AP 3 (Step S101). Subsequently, the CIS 2 captures an image, and outputs the image to the AP 3 (Step S102). Then, the CIS 2 detects the illuminance of the surroundings (Step S103), and determines the change range of the frame rate in accordance with the illuminance (Step S104).

Subsequently, the CIS 2 calculates an accident prediction score by the DNN (Step S105), and determines whether or not to change the frame rate and resolution of the captured image based on the accident prediction score (Step S106).

Then, when the change is determined not to be made (Step S106, No), the CIS 2 shifts the processing to Step S102. Furthermore, when the change is determined to be made (Step S105, Yes), the CIS 2 changes the frame rate and resolution in accordance with the accident prediction score (Step S107).

Subsequently, the CIS 2 adjusts luminance data of the captured image in accordance with the changed frame rate (Step S108), and shifts the processing to Step S102. Then, the CIS 2 repeatedly executes the processing of Steps S102 to S108 until the power source of the vehicle is turned off.

4. Other Embodiments

The processing according to the above-described embodiment may be carried out in various different forms other than the above-described embodiment. The image recording device 1 may be provided in an object other than a vehicle.

For example, the image recording device 1 may be provided in a drone. In such a case, for example, when finding a target to be imaged, the CIS 2 increases the frame rate and resolution. For example, in the case of a drone in flight for bird watching, the CIS 2 increases the frame rate and resolution when a bird is found in an image. Thus, the image recording device 1 can capture a decisive moment of the target to be imaged.

Furthermore, when an object to be captured is not a bird, the CIS 2 detects an obstacle that has suddenly entered the image frame, and increases the frame rate and resolution. This allows the image recording device 1 to record that a bird causes a crash when a bird suddenly flies from a side to collide against a drone and the drone has crashed, for example. In the case, as described above, the image recording device 1 quickly changes the frame rate and resolution after the accident is predicted, so that the image recording device 1 can reliably capture an image of an object that suddenly enters the image frame, and record the image.

Furthermore, for example, when the fact that an external factor such as wind moves the drone in a direction different from the intended direction of a drone operator is detected from an image, the CIS 2 immediately increases the frame rate and resolution, so that the CIS 2 can reliably record the moment of an accident such as a crash.

Furthermore, the image recording device 1 may be installed in a factory, for example. In such a case, the CIS 2 increases the frame rate and resolution when a person approaches a robot or a dangerous object that operate in a factory, for example. This allows the image recording device 1 to record the situation of an injury accident that occurs in the factory.

Note that, although, in the above-described embodiment, a case where the CIS 2 includes the predicting unit 7 has been described, the predicting unit 7 may be provided on the side of the AP 3. In such a case, the CIS 2 outputs image data of a captured image to the AP 3, acquires, from the AP 3, an accident prediction score calculated by the predicting unit 7 provided in the AP 3, and changes the frame rate and resolution in a procedure similar to the above-described procedure.

Note, however, that, when the predicting unit 7 is provided on the side of the AP 3, it takes time to transmit the image data to the AP 3 and to acquire the accident prediction score from the AP 3. Thus, the predicting unit 7 is desirably provided on the side of the CIS 2.

Furthermore, the processing procedure, control procedure, specific name, and information including various pieces of data and parameters in the above document and drawings can be optionally changed unless otherwise specified. Furthermore, the specific examples, distributions, numerical values, and the like described in the examples are merely examples, and can be optionally changed.

Furthermore, each component of each illustrated device is functional and conceptual, and does not necessarily need to be physically configured as described. That is, the specific form of distribution/integration of each device is not limited to the illustrated form, and all or part of the device can be configured in a functionally or physically distributed/integrated manner in any unit in accordance with various loads and usage situations. For example, the predicting unit 7 and the changing unit 8 in FIG. 1 may be integrated.

Furthermore, the above-described embodiments and variations can be appropriately combined as long as the processing contents do not contradict each other.

5. Effects

The CIS 2 includes the imaging unit 5 and the changing unit 8. The imaging unit 5 captures an image of the surroundings, and generates image data. The changing unit 8 changes the frame rate of an image captured by the imaging unit 5 in accordance with the degree of possibility that a predetermined event occurs, which is predicted based on the image data. This allows the CIS 2 to record an important moment.

The changing unit 8 increases the frame rate as the possibility that a predetermined event occurs is increased. This allows the CIS 2 to record a moment of the occurrence of an event without missing the moment as the possibility that the predetermined event occurs is increased.

The changing unit 8 changes the resolution of an image captured by the imaging unit in accordance with the possibility that a predetermined event occurs. This allows the CIS 2 to adjust imaginable time by changing the data amount of the image data in accordance with the degree of possibility that a predetermined event occurs, for example.

The changing unit 8 increases the resolution as the possibility that a predetermined event occurs is increased. A predetermined event can be recorded in a more high-definition image as the possibility that the event occurs is increased.

The CIS 2 includes a predicting unit 7 that predicts the degree of possibility that a predetermined event occurs based on the image data. This allows the CIS 2 to change the frame rate and resolution more quickly than in the case where the predicting unit 7 is provided outside the CIS 2.

The predicting unit 7 predicts the degree of possibility that a predetermined event occurs by DNN processing using the DNN. This allows the predicting unit 7 to accurately predict the degree of possibility that a predetermined event occurs.

The predicting unit 7 predicts the degree of possibility that an accident occurs. This allows the CIS 2 to record all the details of an accident and the moment of the occurrence of the accident more reliably than in the case of a fixed frame rate.

The CIS 2 includes the illuminance detecting unit 9 that detects the illuminance of the surroundings. The changing unit 8 determines the change range of the frame rate in accordance with the illuminance detected by the illuminance detecting unit 9. This allows the CIS 2 to prevent the occurrence of a black defect in a captured image by decreasing the upper limit of the frame rate as the illuminance is decreased, for example.

The imaging unit 5 adjusts luminance data of the captured image in the image data in accordance with the frame rate changed by the changing unit 8. This allows the CIS 2 to capture an image, which does not give a visual discomfort to the captured image even when the frame rate is changed, by increasing the luminance of the captured image as the frame rate is increased.

The image recording device includes the CIS 2 and the recording unit. The CIS 2 includes the imaging unit 5 and the changing unit 8. The imaging unit 5 captures an image of the surroundings, and generates image data. The changing unit 8 changes the frame rate of an image captured by the imaging unit 5 in accordance with the degree of possibility that a predetermined event occurs, which is predicted based on the image data. The recording medium 4 records an image captured by the CIS 2. This allows the image recording device to record an important moment.

An imaging method according to the present disclosure includes capturing an image of the surroundings, generating image data, and changing the frame rate of the captured image in accordance with the degree of possibility that a predetermined event occurs, which is predicted based on the image data. This allows an important moment to be recorded.

Note that the effects set forth in the specification are merely examples and not limitations. Other effects may be exhibited.

Note that the present technology may also have the configurations as described below.

(1)

An imaging device including:

an imaging unit that captures an image of surroundings and generates image data; and a changing unit that changes a frame rate of an image captured by the imaging unit in accordance with a degree of possibility that a predetermined event occurs, which is predicted based on the image data.

(2)

The imaging device according to (1), wherein the changing unit increases the frame rate as the possibility is increased.

(3)

The imaging device according to (1) or (2), wherein the changing unit changes resolution of an image captured by the imaging unit in accordance with the possibility.

(4)

The imaging device according to (3), wherein the changing unit increases the resolution as the possibility is increased.

(5)

The imaging device according to any one of (1) to (4), further including a predicting unit that predicts a degree of possibility that the predetermined event occurs based on the image data.

(6)

The imaging device according to (5), wherein the predicting unit predicts a degree of the possibility by deep neural network (DNN) processing using a DNN.

(7)

The imaging device according to (5) or (6), wherein the predicting unit predicts a degree of possibility that an accident occurs.

(8)

The imaging device according to an one of (1) to (7), further including an illuminance detecting unit that detects illuminance of the surroundings, wherein the changing unit determines a change range of the frame rate in accordance with the illuminance detected by the illuminance detecting unit.

(9)

The imaging device according to an one of (1) to (8), wherein the imaging unit adjusts luminance data of a captured image in the image data in accordance with the frame rate changed by the changing unit.

(10)

An image recording device including:

an imaging device including:

an imaging unit that captures an image of surroundings and generates image data; and a changing unit that changes a frame rate of an image captured by the imaging unit in accordance with a degree of possibility that a predetermined event occurs, which is predicted based on the image data; and a recording unit that records an image captured by the imaging device.

(11)
An imaging method including:
capturing an image of surroundings, and generating image data; and
changing a frame rate of a captured image in accordance with a degree of possibility that a predetermined event occurs, which is predicted based on the image data.

REFERENCE SIGNS LIST

1 IMAGE RECORDING DEVICE
2 CIS
3 AP
31 AP CONTROL UNIT
32 COMMUNICATION I/F
4 RECORDING MEDIUM
5 IMAGING UNIT
51 LIGHT RECEIVING UNIT
52 READING UNIT
6 COMMUNICATION I/F
7 PREDICTING UNIT
8 CHANGING UNIT
9 ILLUMINANCE DETECTING UNIT

The invention claimed is:

1. An imaging device, comprising:
circuitry configured to:
capture an image of surroundings to generate image data;
calculate, based on deep neural network (DNN) processing using a DNN, an accident prediction score indicating a degree of possibility that an accident, wherein the DNN is generated by machine learning based on image data of a plurality of images captured before occurrence of the accident and image data of a plurality of images based on a determination that no accident has occurred after the image is captured;
change a frame rate of the captured image based on the degree of possibility; and
change a luminance of the captured image based on the change in the frame rate and change in a gain of an amplifier that amplifies the luminance of the captured image.

2. The imaging device according to claim 1, wherein the circuitry is further configured to increase the frame rate as the degree of possibility is increased.

3. The imaging device according to claim 1, wherein the circuitry is further configured to increase a resolution of the captured image as the prediction score increases.

4. The imaging device according to claim 3, wherein the circuitry is further configured to decrease the resolution and the frame rate as the prediction score decreases.

5. The imaging device according to claim 1, wherein the circuitry is further configured to:
detect illuminance of the surroundings; and
determine a change range of the frame rate based on the detected illuminance.

6. The imaging device according to claim 1, wherein the circuitry is further configured to increase the luminance of the captured image as the frame rate of the captured image is increased.

7. The imaging device according to claim 1, wherein the circuitry is further configured to:
detect illuminance of the surroundings;
set, based on the detected illuminance, an upper limit of the frame rate of the captured image, wherein
the upper limit of the frame rate is decreased as the detected illuminance of the surroundings decreases; and
change the frame rate of the captured image based on the set upper limit.

8. An image recording device, comprising:
an imaging device including:
circuitry configured to:
capture an image of surroundings and generate image data;
calculate, based on deep neural network (DNN) processing using a DNN, an accident prediction score indicating a degree of possibility that an accident occurs, wherein the DNN is generated by machine learning based on image data of a plurality of images captured before occurrence of the accident and image data of a plurality of images based on a determination that no accident has occurred after the image is captured;
change a frame rate of the captured image based on the degree of possibility; and
change a luminance of the captured image based on the change in the frame rate and change in a gain of an amplifier that amplifies the luminance of the captured image; and
a memory configured to record the image captured by the imaging device.

9. An imaging method, comprising:
capturing an image of surroundings, and generating an image data;
calculating, based on deep neural network (DNN) processing using a DNN, an accident prediction score indicating a degree of possibility that an accident, wherein the DNN is generated by machine learning based on image data of a plurality of images captured before occurrence of the accident and image data of a plurality of images based on a determination that no accident has occurred after the image is captured;
changing a frame rate of the captured image based on the degree of possibility; and
changing a luminance of the captured image based on the change in the frame rate and change in a gain of an amplifier that amplifies the luminance of the captured image.

* * * * *